US011951057B2

(12) United States Patent
Simson

(10) Patent No.: US 11,951,057 B2
(45) Date of Patent: Apr. 9, 2024

(54) PATIENT LIFTING APPARATUS AND METHOD

(71) Applicant: Anton K. Simson, Truckee, CA (US)

(72) Inventor: Anton K. Simson, Truckee, CA (US)

(73) Assignee: DME Innovations, Inc., San Diego, CA (US)

( * ) Notice: Subject to any disclaimer, the term of this patent is extended or adjusted under 35 U.S.C. 154(b) by 0 days.

(21) Appl. No.: 17/503,627

(22) Filed: Oct. 18, 2021

(65) Prior Publication Data

US 2022/0031542 A1 Feb. 3, 2022

Related U.S. Application Data

(63) Continuation of application No. 16/293,402, filed on Mar. 5, 2019, now Pat. No. 11,147,727, which is a (Continued)

(51) Int. Cl.
*A61G 7/10* (2006.01)

(52) U.S. Cl.
CPC ......... *A61G 7/1082* (2013.01); *A61G 7/1017* (2013.01); *A61G 7/1049* (2013.01); (Continued)

(58) Field of Classification Search
CPC .. A61G 7/1017; A61G 7/1082; A61G 7/1049; A61G 7/1053; A61G 7/1055; A61G 7/1015; A61G 7/1051
See application file for complete search history.

(56) References Cited

U.S. PATENT DOCUMENTS 2,125,546 A * 8/1938 Corr ..................... A61G 7/1074
212/343
2,203,204 A * 6/1940 Nicolai ................ A61G 7/1015
212/343

(Continued)

FOREIGN PATENT DOCUMENTS

JP 2004-135855 5/2004
JP 2004135855 A * 5/2004

(Continued)

*Primary Examiner* — Justin C Mikowski
*Assistant Examiner* — Alison N Labarge
(74) *Attorney, Agent, or Firm* — Charmasson, Buchaca & Leach, LLP

(57) ABSTRACT

A device, for grasping a limp body, such as a paraplegic or a quadriplegic patient (19), and transferring the body to another location or moving it into a different position, comprises two pivotally connected sections (12,13), one positioned to grasp the torso portion (18), the other the pelvic one (17). The sections can be kept in line with each other or pivoted toward each other to place the patient in a seated position. Each section comprises an upper frame (14) from the opposite longitudinal edges of which extends a pair of articulated grasping members positioned to move astride the torso or pelvis of the patient. The members include series of transversal cantles which can be directed to curl inwardly toward each other and securely enwrap and grab the load. The frame and the supported patient can then be hoisted, moved and deposited into a supine or seating position. Each member includes a series of successively hinged segments tilted by pulling cables.

14 Claims, 10 Drawing Sheets

Related U.S. Application Data continuation of application No. 15/023,646, filed as application No. PCT/US2015/052504 on Sep. 25, 2015, now Pat. No. 10,238,565.

(60) Provisional application No. 62/207,863, filed on Aug. 20, 2015, provisional application No. 62/055,132, filed on Sep. 25, 2014.

(52) U.S. Cl.
CPC ......... *A61G 7/1053* (2013.01); *A61G 7/1055* (2013.01); *A61G 7/1015* (2013.01)

(56) References Cited

U.S. PATENT DOCUMENTS

| | | | | | |
|---|---|---|---|---|---|
| 5,833,291 | A * | 11/1998 | Haugs | B65G 47/908 | 294/119.3 |
| 6,230,342 | B1 * | 5/2001 | Haugs | A61G 7/05776 | 5/607 |
| 6,971,126 | B1 * | 12/2005 | Kluckhuhn | A61G 7/1088 | 5/81.1 R |
| 9,060,907 | B2 * | 6/2015 | Ackerman | A61G 7/065 | |
| 2007/0295339 | A1 * | 12/2007 | Mizuno | A61G 7/1057 | 128/845 |
| 2010/0275370 | A1 * | 11/2010 | Van Loef | A61G 7/1038 | 5/81.1 R |

FOREIGN PATENT DOCUMENTS

| | | | |
|---|---|---|---|
| JP | 2010131063 | A * | 6/2010 |
| JP | 2013078601 | A * | 5/2013 |

* cited by examiner

PATIENT LIFTING APPARATUS AND METHOD

PRIOR APPLICATION

This application is a continuation of U.S. patent application Ser. No. 16/293,402, filed 2019 Mar. 5, U.S. patent Ser. No. 11/147,727, issued 2021 Oct. 19, which is a continuation of U.S. patent application Ser. No. 15/023,646, filed 2016 Mar. 21, U.S. patent Ser. No. 10/238,565, issued 2019 Mar. 26, which is a 371 of International Application No. PCT/US2015/052504, filed 2015 Sep. 25 which claims the benefit of U.S. Provisional Patent Application Serial Nos. 62/055,132, filed 2014 Sep. 25 and 62207863, filed 2015 Aug. 20 all of which are incorporated herein by reference.

FIELD OF THE INVENTION

The invention relates to medical appliances, and more specifically to devices for supporting and transferring a paraplegic or quadriplegic patient.

BACKGROUND

Currently, increasing requirements are being imposed on hospitals, convalescent homes and home care agencies to assure quality and safety of care for both patients and medical practitioners. Care giver shortage, worker injuries and an aging workforce have led to renew emphasis on care giver injury prevention. In the United States and abroad legislation has been proposed to eliminate manual lifting and transferring of patients.

Prior art patient lifts rely on fabric slings upon which the patient must be progressively rolled and lifted, or that need to be slid under the invalid. The installations of these slings usually requires a great deal of exertion on the part of multiple care givers, and are often the cause of occupational injuries to the care givers as well as potential injuries to the invalid.

A major additional problem with slings is their limited life and unknown strength condition. Although they may appear serviceable, the material ages with time and its ability to carry a load deteriorates. Its exposure to improper washing and drying environments (including harsh chemicals, high temperatures, etc.) which may vary substantially among different users is a critical factor. A chemically or thermally altered sling material may lose a significant portion of its load carrying capability and be unsafe for use, while still appearing serviceable.

Current practice with fabric slings is to discard them early in their potential useful life. They demand special washing and drying procedures, and are often discarded after a single use. All of these procedures and options result in increased costs.

Therefore, there is a need for a patient lifting apparatus which addresses some or all of the above identified inadequacies.

SUMMARY

The principal and secondary objects of the invention are to provide an improved patient lift apparatus. These and other objects are achieved by a lift which is fitted with comfortable grasping members that curl around the individual.

In some embodiments the curling fingers grasp the upper and lower parts of the patient from above then lift the whole limp body and reposition it into either a supine or a seating position.

In some embodiments the present invention addresses the above-mentioned deficiencies in the prior art patient lifts, and furthermore allows a mobility-challenged patient to effectuate transfers from bed to wheelchair and back without care giver assistance.

In some embodiments there is provided a cradle for lifting and moving a limp body which comprises: a first support frame; a grasping member extending from a first edge of said support frame; said member comprising: a plurality of horizontal, elongated cantles sequentially linked to one another along their longer sides and concomitantly orientable into an arcuate configuration of said member; and a curling mechanism for concurrently rotating said cantles.

In some embodiments said member further comprises a flexible first flat surface; and, wherein said curling mechanism comprises: a series of spaced-apart segments of progressively diminishing height projecting from said first flat surface; and, each of said segments comprising a base and an opposite side; and a driving mechanism for simultaneously rotating said segments about axes parallel to said cantles.

In some embodiments said curling mechanism further comprises a resilient stiffener acting against said driving mechanism.

In some embodiments said resilient stiffener comprises a resiliently bendable member connected to at least one adjacent pair of said segments.

In some embodiments the cradle further comprises: a second support frame rotatively attached to said first support frame; a second of said grasping member extending from said first edge of said second support frame; and a driving device for rotatively folding said second support frame toward said first support frame.

In some embodiments the cradle further comprises a third of said grasping member and curling mechanism extending from an opposite second edge of said first support frame.

In some embodiments the cradle further comprises a fourth of said grasping members and curling mechanism extending from a second edge of said second support frame opposite the third of said grasping members.

In some embodiments said driving mechanism further comprises a first tensioning member for haling said segments toward one another.

In some embodiments said opposite side has a channel defined therein and parallel thereto, housing said member.

In some embodiments each of said segments further comprises: a spur projecting from a first lateral edge substantially perpendicular to said base; an opposite second lateral edge having a slot shaped and dimensioned to receive a linking one of said spur associated with an adjacent segment; and a fastener rotatively securing said linking one of said spur into said slot.

In some embodiments said driving mechanism further comprises: a rotatable shaft; a cam centrally mounted on said shaft and having a first peripheral area; a first rocker linking said first peripheral area to said tensioning member; a rotator coupled to said shaft; wherein said tensioning member comprises a cable acting upon said segments.

In some embodiments said driving mechanism further comprises: a second of said tensioning member; said first and second tensioning members running through longitudinally opposite regions of said cantles; and a second rocker linking said second tensioning member to a second peripheral area of said cam astride said shaft.

In some embodiments said rotator comprises: a lever perpendicularly connected to said cam; a motor; and a clutch selectively coupling said motor to said cam.

In some embodiments said driving mechanism further comprises a modular housing mounted on said support frame and holding said shaft, rotator, cam and rockers.

In some embodiments said housing comprises: a plurality of enclosing walls; and a pair of linking elements, each having a proximal end secured to one of said rockers and a terminal end having a releasable connector accessible through one of said walls.

In some embodiments each of said grasping members and curling mechanism further comprise: a rotatable shaft; a cam centrally mounted on said shaft and having a first peripheral area; a first rocker linking said first peripheral area to said tensioning member; a rotator coupled to said shaft; wherein said tensioning member comprises a cable acting upon said segments.

In some embodiments each of said driving mechanisms further comprises: a second of said tensioning member; said first and second tensioning members running through opposite longitudinal regions of said cantles; and a second rocker linking said second tensioning member to a second peripheral area of said cam astride said shaft.

In some embodiments each of said rotators comprises: a lever perpendicularly connected to said cam; a motor; and a clutch selectively coupling said motor to said cam.

In some embodiments each of said curling mechanism comprises a modular housing mounted on one of said support frames and holding said shaft, motor, cam and rockers.

In some embodiments said rotator comprises: a lever perpendicularly connected to said shaft; a motor; and a clutch selectively coupling said motor to said shaft.

In some embodiments each of said segments comprises at least one trapezoidal block.

In some embodiments said grasping member further comprises a bendable sheet slidingly capping said distal sides.

In some embodiments said grasping member further comprises a flexible second flat surface astride said segments with said first flat surface, said second flat surface being slidingly connected to said segments.

In some embodiments said member further comprises a flexible second flat surface astride said segments with said first flat surface, said segments being hingedly connected to said flat surfaces and parallel to said cantles.

In some embodiments said cradle further comprises at least one form-fitting sleeve made from a flexible sheet material.

The original text of the original claims is incorporated herein by reference as describing features in some embodiments.

DESCRIPTION OF THE PREFERRED EMBODIMENTS

Figure 1:
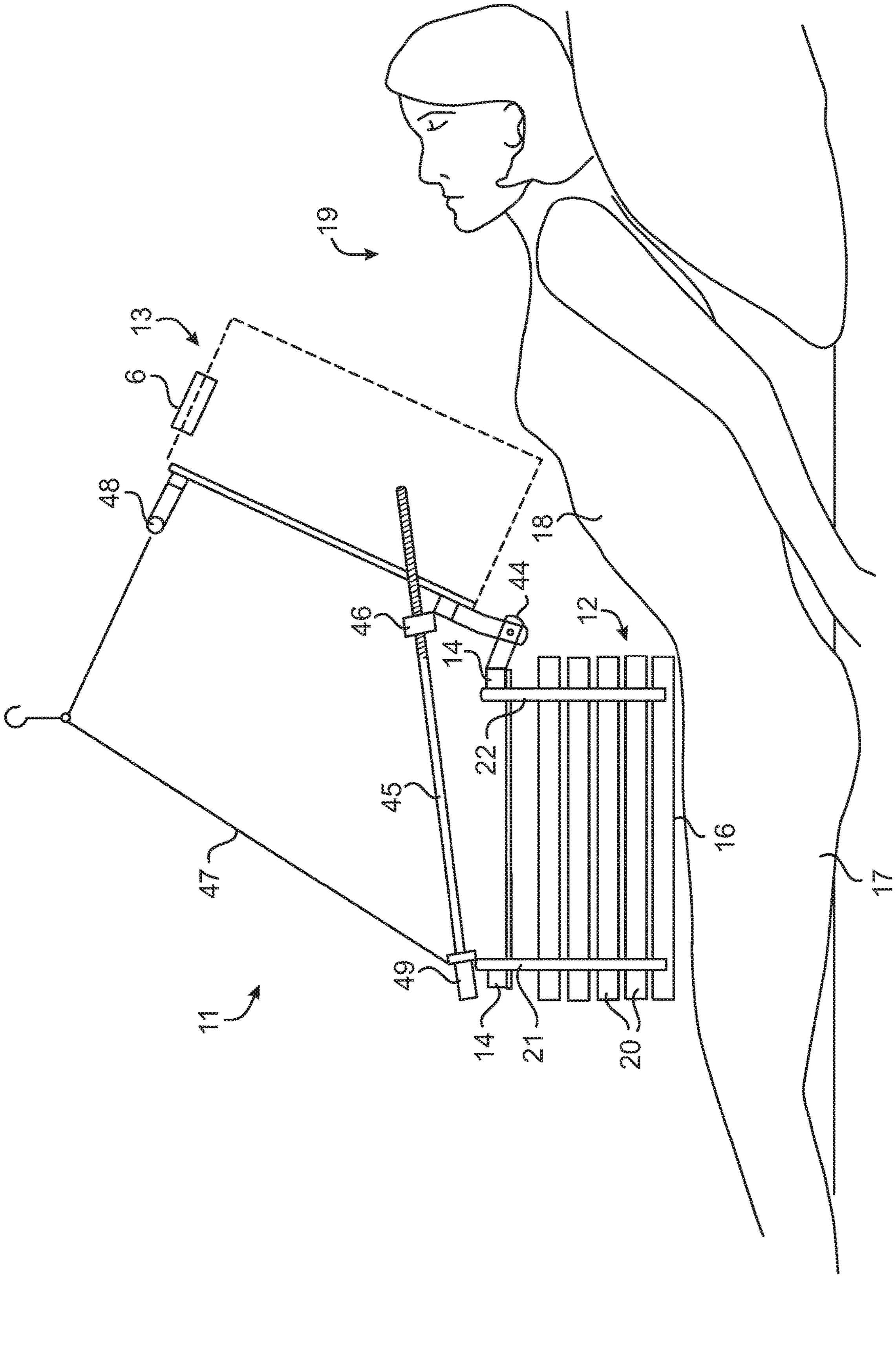
FIG. 1 is a diagrammatical side representation of the patient lift according to an exemplary embodiment of the invention.
Figure 2:
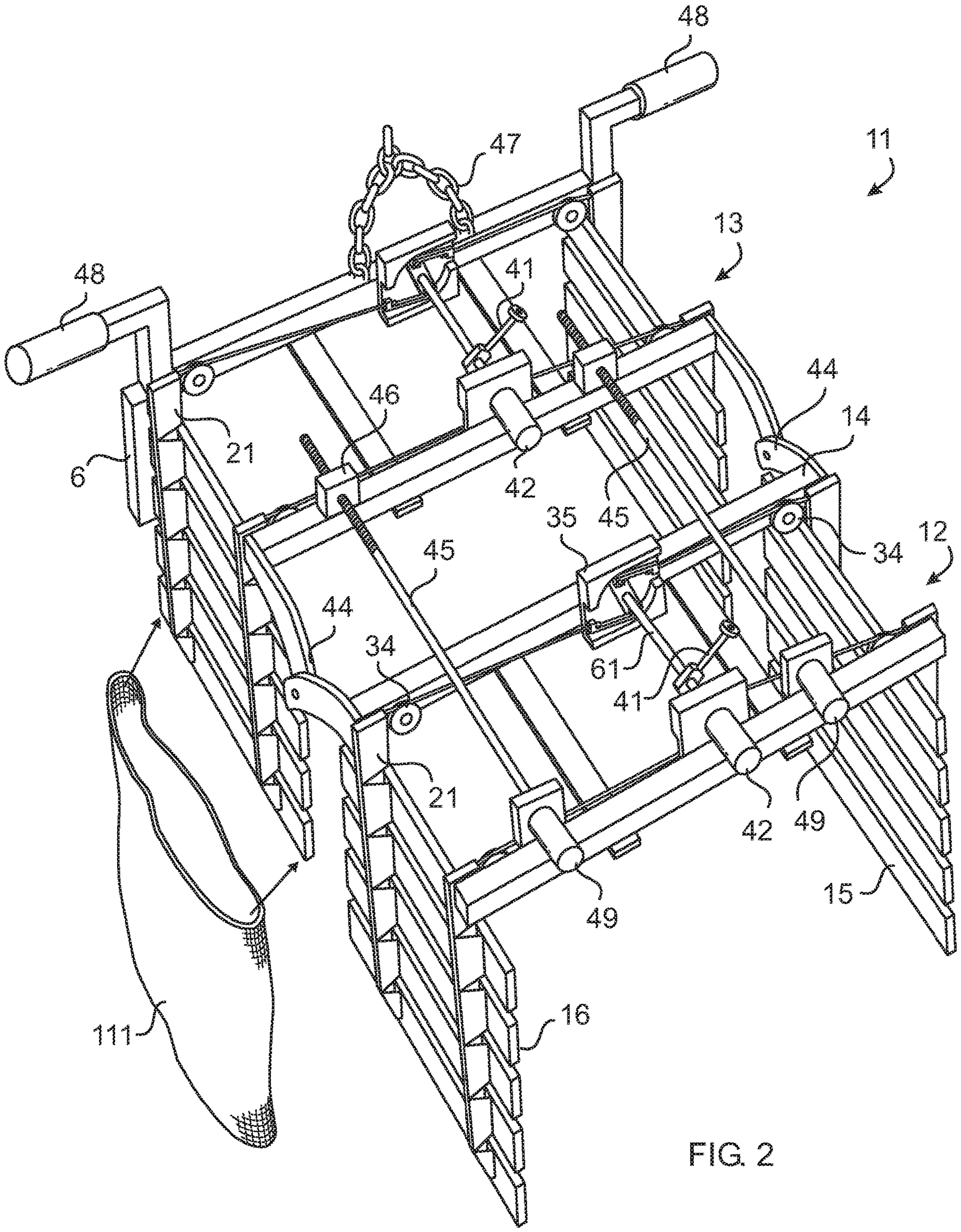
FIG. 2 is a diagrammatical perspective view thereof.

Referring now to the drawing, there is shown in FIGS. 1 and 2 a patient lift 11 according to an exemplary embodiment of the invention which is primarily intended to allow a bed or wheelchair bound patient's limp body to be lifted and transferred into another appliance or to another location under the control of the patient, or of a care giver, with very little manual force required.

The control of such a device may be through a series of switches and levers mounted within reach of the patient or on a wireless or cable-connected console operable by an assisting person or by the patient.

The lift comprises two quasi-identical pivotally connected grabbing structures, the first 12 adapted to encompass and lift the pelvic portion of the body, and the second 13 adapted to encompass and lift the torso. Each structure comprises a parallelogrammic support frame 14 from which extend along opposite lateral edges a pair of grasping members 15,16 dimensioned and positioned to move along each side of the load either the pelvis and thigh area 17 or the torso 18 of the patient 19 as illustrated in FIGS. 1 and 2.

Each grasping member can be caused to curl inwardly toward the other and to gently slide and penetrate under or around the patient's body. Each member can include a series of independent, parallel, rigid, longitudinal tying members in the form of slats or cantles 20 supported outwardly by two transversal articulated ribs 21,22 secured at their upper extremities to the frame 14. Each slat can be securely riveted or bolted in a latitudinally spaced apart manner to a rib segment on each of the two transversal ribs. Alternately, the slat and one or more of the contacted rib segments can be molded as a unitary component. Alternately, the slats as a group can be formed by a unitary sheet of durable, rigid sheet material such as plastic having longitudinal creases to delineate the cantles and to form hinges between them. These operationally equivalent alternate versions result in cantles sequentially linked to one another along their longer sides.

It should be noted that the device can be implemented with a single grasping member or two members on a single side for use in shoving a patient into a different position.

Figure 3:
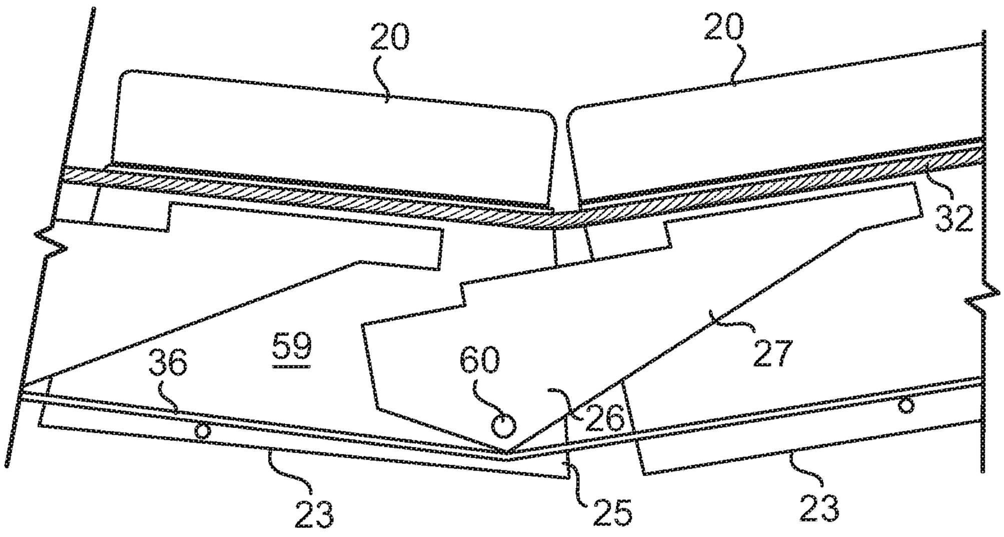
FIG. 3 is a diagrammatical partial side view of the joint segments.
Figure 4:
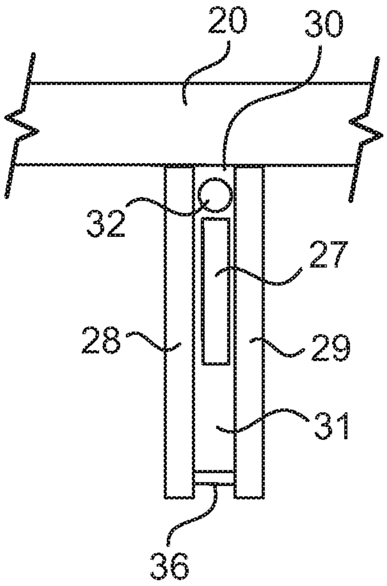
FIG. 4 is a diagrammatical cross-sectional view of a segment.
Figure 6:
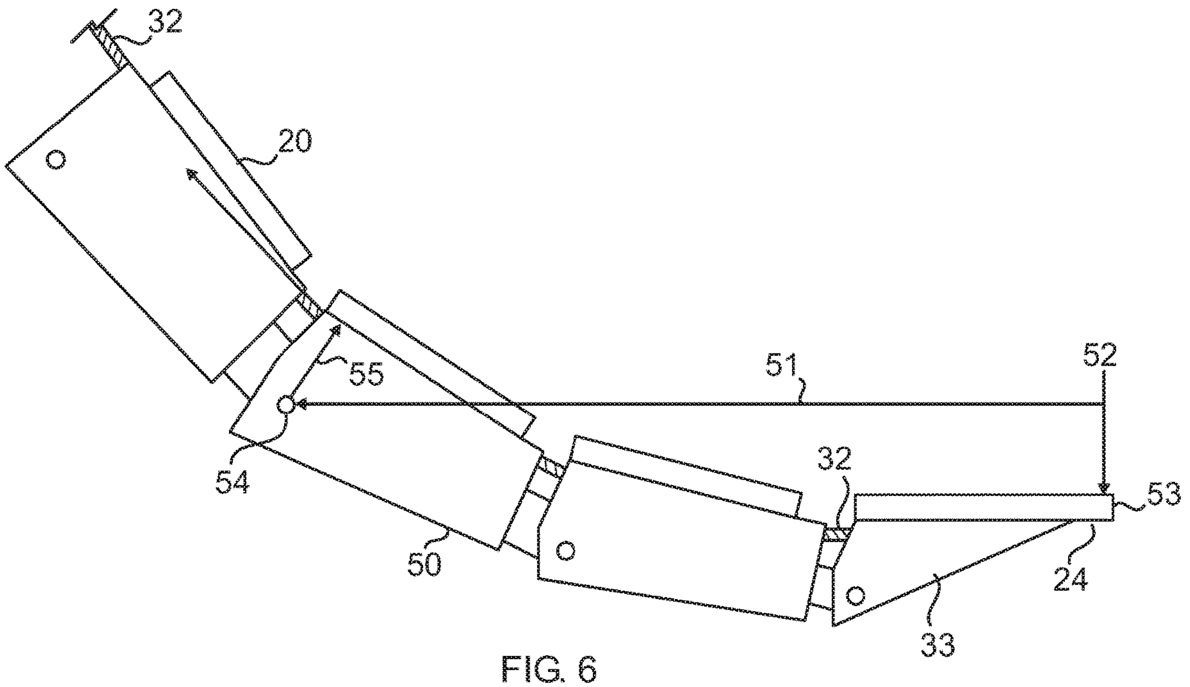
FIG. 6 is a diagrammatical fractional side view of a rib.

As illustrated in FIGS. 3, 4 and 6, each rib can be made of a chain of trapezoidal segments 23 whose overall heights progressively diminish toward the free tip 24. Each segment, in its proximal section has a slot 25 shaped and sized to accept a spur forming a tongue 26 projecting from the distal end of the preceding segment. The segment is conveniently made of a slug 27 sandwiched between a pair of trapezoidal plates 28, 29. The plates extend slightly beyond the width of the slug forming upper and lower channels 30,31 along the longitudinal edges of the segment and form a slot 59 sized to movably accept the spur of an adjacent segment. A fastener such as a pin 60 rotatively secures the spur of one segment within the slot of an adjacent segment.

The innermost of the upper and lower channels is capped by one of the slats 20 and houses an oblong, flexible, but substantially inelastic tensioning member such as a steel ribbon or a pull cable 32 running from the most distal and smallest segment 33, over a pulley 34 mounted on the support frame 14, to a toggling mechanism 35 that pulls and locks the cable and thus forces the rib and slats to curl inwardly in a grasping motion and remain in this locked, load-carrying position until the mechanism is reversed out of the toggled position. A resilient stiffener such as a leaf spring 36 engaged into the outer channel 31 of the segments provides a resilient force against the pull of the cable and returns the rib to a straight configuration when the pull of the cable is released.

Figure 5:
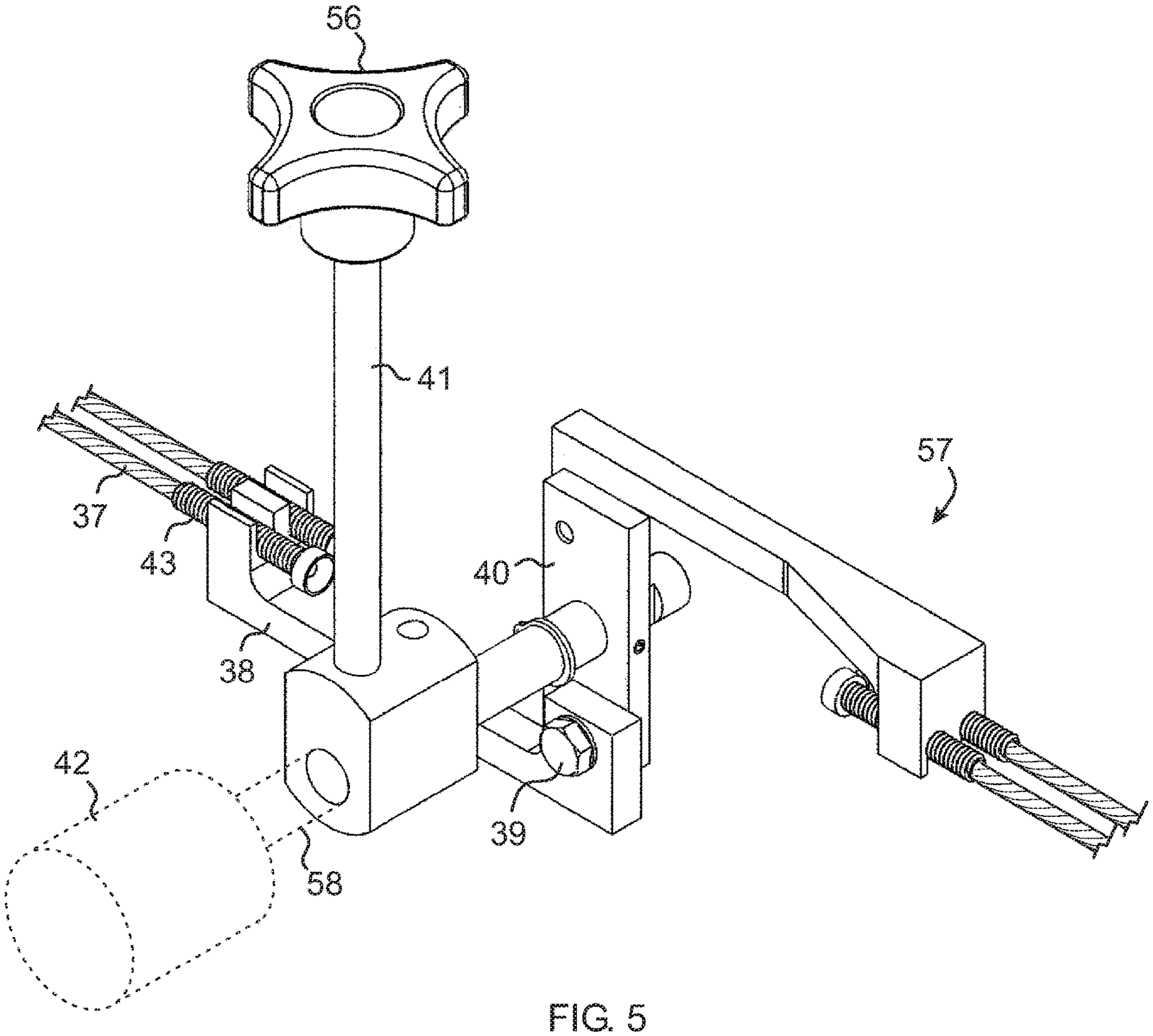
FIG. 5 is a diagrammatical front view of an exemplary toggling mechanism.

As illustrated in FIG. 5, the proximal end 37 of the cable can be attached to a rocker 38 rotatively secured by a bolt 39 to an oblong cam 40 rotated either manually by a lever 41, or automatically by a motor 42 driving a central rod 58 shown in phantom lines. A symmetrical cable, pulley and terminal assembly 57 can be associated with the opposite grasping member and rib, and thus balance the load on the driving mechanism. When the cam 40 reaches a position parallel to the cables there is no more additional pull force applied to the cables, and the mechanism toggles into a dead mode locking the structures 12, 13 into a secure grasping and lifting configuration. A cable tension adjustment screw 43 can be provided at the proximal end of the cable. The shaft 58 of the motor can be decoupled from the cam 40, and the mechanism operated manually by turning the knob 56 at the free end of the lever 41. The motor 42 is preferably a bidirectional electrical one with a speed-reducing gear-work which allows the cam 40, when the shaft is engaged, to rotate over a span of 180 degrees in approximately 5 seconds.

It shall be understood, as shown in FIG. 2, that a single motor or lever can rotate a drive shaft 61 connected to one or more cams each driving a pair of ribs. The rotation of the segments relative to one another can be equivalently implemented by a sequence of screw drives, gears, or chains and gears according to well-known techniques in the relevant art.

The pelvic and torso structures are rotatively connected by a hinge 44 and their respective orientation is controlled by a driving device formed by a pair of Acme thread screws 45 driven by either a hand crank or a motor 49 mounted on one of the frames, and having its distal section engaged into a nut 46 mounted on the other frame. Accordingly, the relative position of the structures can be adjusted between a supine position and a seated position of the patient.

For sanitary reasons, each of the grasping members can readily be inserted into a disposable or washable form-fitting sleeve 111 made from fabric, plastic or other flexible sheet material.

A chain 47 attached to one or both of the grasping members can be used to suspend the device to a ceiling winch or a transfer carriage. Handle bars 48 at the top of the torso structure can be used by the patient to rock and wag the grasping members in order to facilitate their insertion around his or her body. The handle bars can also provide a convenient location for mounting controls. Either structure may me extended to provide support for the head, legs and feet with additional supporting ribs. A single head-to-toe structure can be provided to simplify lifting a supine body.

The pulling cable 32 can be made of stainless steel. Its tension need not exceed about 500 kgs (1,100 lbs), considering the tension necessary to rotate each and all the segments of a rib under a 100 kgs (220 lbs) load.

As illustrated in FIG. 6, an average 6.6 cm (2.6 in) by 2.5 cm (1.0 in) third segment 50 measured from the tip of the rib, forms a typical lever arm 51 of 15 cms (6 in) between the load 52 on the tip 53 of the last slat and the third-to-fourth pivot pin 54. This creates a torque of 1500 cm-kg (1320 in/lbs) which considering a cable lever 55 of 2.8 cms (1.2 in), requires only 471 kgs (1,100 lbs) of tension.

This embodiment contemplates a 0.624 cm (⅛ in) steel cable and a rib compressive load of 34 atmospheres (500 psi). A four rib assembly can carry a load of 340 kgs (800 lbs). The pivot points of the segments can be located near the outside edges of the ribs so that the weight of the grasping members tends to bias the structure inward.

The general operation and basic design parameters of an individual rib can be more fully understood by looking at a simple force and moment diagram of the most distal segment of a typical rib. The end segment generally is the most critical since it is desirable to have it as thin as possible at the same time as it is carrying the most extreme potential load 52 at its tip 53.

Since ribs are generally configured in pairs and two pairs are used to hold the slats that support the upper body and two pairs are used for the lower body, it is expected that eight ribs will be used to support a patient. If each rib supports 45.45 kgs (100 lbs), the gross lifting capability for an eight rib patient lift would be 363.6 kgs (800 lbs). As shown below, this value can be readily increased by varying the design conditions.

Figure 7:
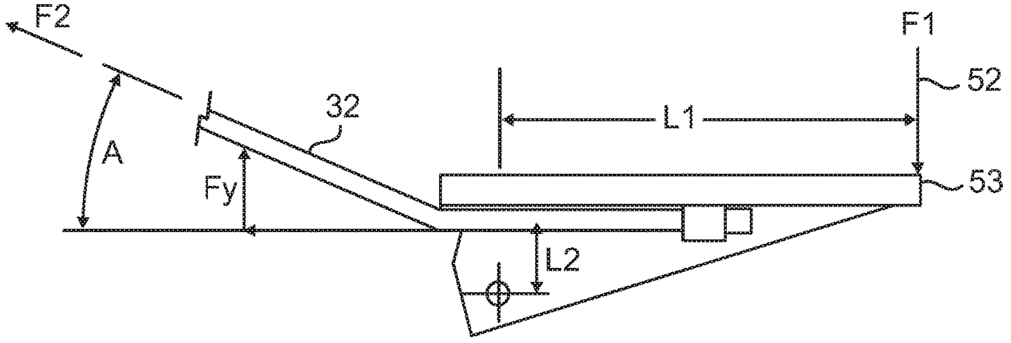
FIG. 7 is a diagrammatical side view of the tip segment load distribution.

As shown in FIG. 7, the primary design parameters can be:

F1 (52)—The vertical load on the end of the rib segment.

L1—The horizontal length between the load and the pivot point.

F2 (32)—The tension in the cable pulling at the angle of the adjoining segment.

A—The angle between adjoining rib segments.

L2—The vertical distance between the cable and the pivot point.

The cable forces acting on the segment can be further broken down as those acting along the axis of the segment, (i.e. Fx), or perpendicular to the axis of the segment, (i.e. Fy).

Summing the moments around the pivot point results in the following simple design relationship:

$$(F1)(L1)=(Fx)(L2)$$

$$L2=(F1/Fx)(L1)$$

for:

F1=45.45 kgs (100 lbs)

F2=454.5 kgs (1000 lbs)

A=25 degrees

L1=5 cms (2 in)

then:

$$Fx=(F2)(\cos A)=(454.5)(\cos 25)=(454.5)(0.906)=412 \text{ kgs (906 lbs)}.$$

and:

$$L2=(45.5/412)(2)=0.558 \text{ cm (0.22 in)}$$

A 0.624 cm (⅛ inch) diameter cable can carry tension loads up to about 910 kgs (2000 lbs). Unit compressive loads at the pivot point are dependent on the materials used and the pivot area, but are easily handled by expanding the length and diameter of the pivot area and the use of industrial strength plastics. The design limitations are projected to be associated with the restraint of the lateral cable force, Fy. For the values shown in this embodiment, this force is approximately 192 kgs (423 lbs) and would tend to peel the slats off the rib segment at the point where the cable turns at 25 degrees. In this embodiment, this force is easily contained by sturdy attachment of the slats to the rib segment. Heavier lifts may incorporate rib segments that are formed in the shape of an inverted U cross-section. In this case the lateral loads are contained directly in the segment.

Thus, it can be understood that for reasonable engineering values and sizes, a rib can be designed that will readily meet the design requirements. Even with a worst case load entirely at the tip of the last rib segment, the tension loads and depth of the segment are modest. As one moves up the rib segments, an increase in the L2 dimension (in order to compensate for the effective increase in the L1 dimension), requires that the depth of the ribs increase at approximately 6 degrees. This produces a general rib design that has balanced loads along its length and can be long and slender and narrow at its tip. Typical maximum depths at the lowest pivot point are on the order of 1.25 cm (0.5 in) and grow to approximately 3.8 cm (1.5 in) at the top of the last rib segment.

The lift can be lowered around the patient until it rests completely on the bed. When it is lowered further the grasping members will automatically begin to curl before the pulling of the cables. Armpit pads 6 can be added for comfort along the upper longitudinal edge of the torso structure.

Vibrations may be induced into each grasping member by a motor mounted on each frame and rotating an eccentric load. The vibrations facilitate insertion of the slats under the patient.

Figure 8:
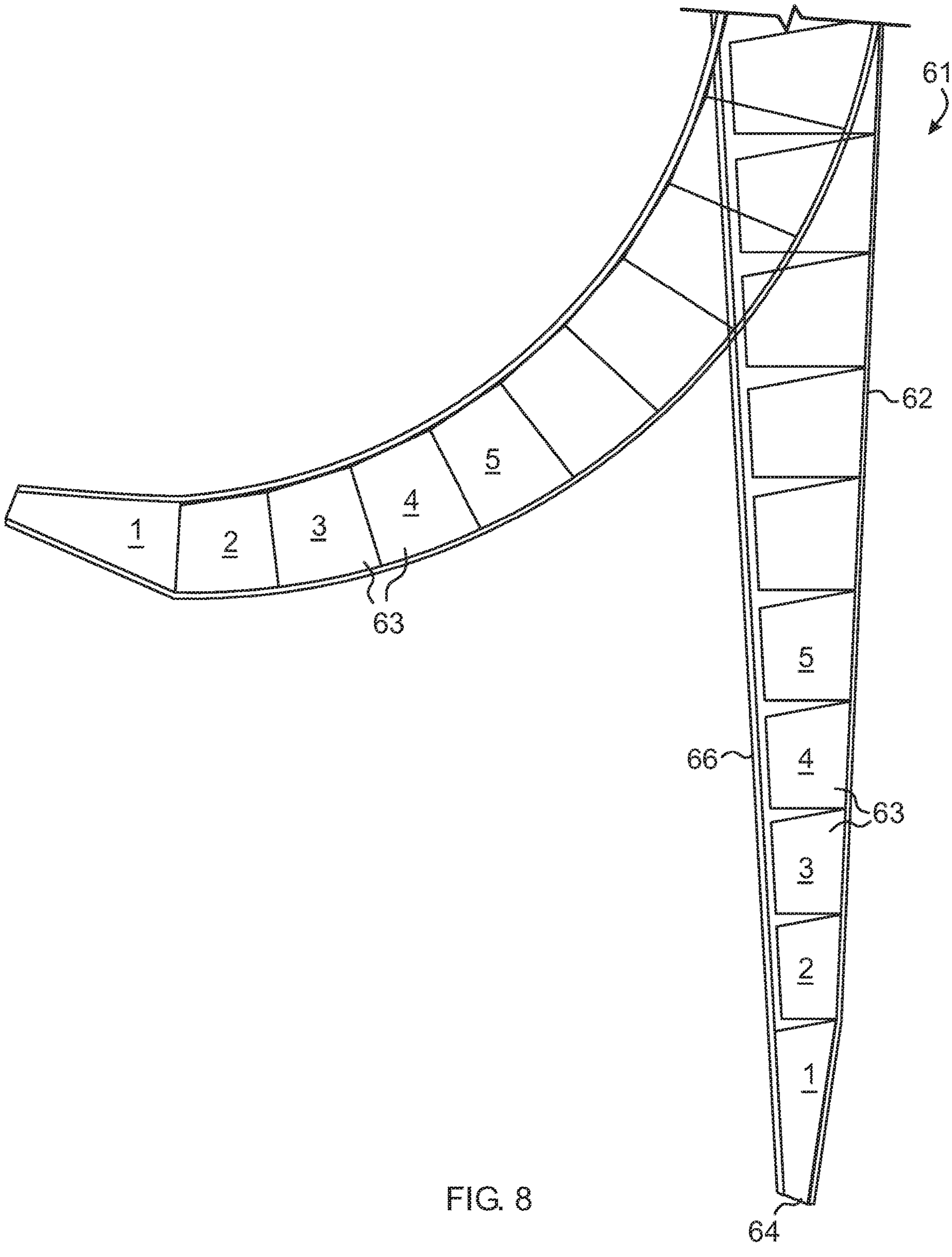
FIG. 8 is a diagrammatical side view of an alternate embodiment of the grasping member.
Figure 9:
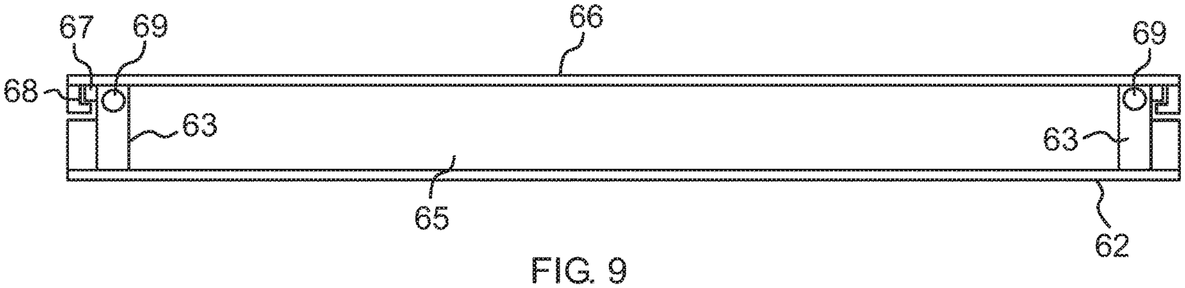
FIG. 9 is a diagrammatical cross-sectional end view of the grasping member of FIG. 8.

Referring now to FIGS. 8 and 9, each of the grasping members may be constituted by a single curling structure 61 devoid of the outer slat-supporting ribs 21 of the previously described embodiment. The outer face of the structure is covered by a flexible first sheet 62 of polypropylene or polyethylene along each of the vertical edges of which are molded a series of aligned trapezoidal segments 63 of progressively diminishing heights as they proceed toward the tip 64 of the curling structure. In the two series of segments each pair of segments is bridged by a reinforcing cross-tie 65. Alternately, each pair of facing segments and their cross-tie can be constituted by a solid trapezoidal bar spanning the lateral edges of the structure. A flexible second sheet 66 is slidingly connected to the top side or inside side of each of the segments opposite the bases that are bonded to the first sheet and secured at the end to the last segment at the tip 64.

As more specifically illustrated in FIG. 9, a spur 67 along each of the top sides rides into a groove 68 practiced along and under each lateral edge of the second sheet. A channel 69 in the top side of each segment can accommodate a tensioning cable as in the previously described embodiment of the grasping members. The curling of the member may be caused by either a pulling force applied to the second flexible sheet, or by the pull of a pair of tensioning cables running through the channels and having their distal extremity secured to the last segment at the tip 64 of the structure. Thus the cable or second sheet can act as a tensioning member for haling the trapezoidal segments toward one another. One or both of the flexible sheets can be resiliently bendable in order to return the member to a linear shape when the pulling force is released. FIG. 8 shows a grasping member in both the open, uncurled position and in the closed, curled positions where the last five segments are numbered consecutively from 1 to 5 beginning with the last, most distal segment.

Figure 10:
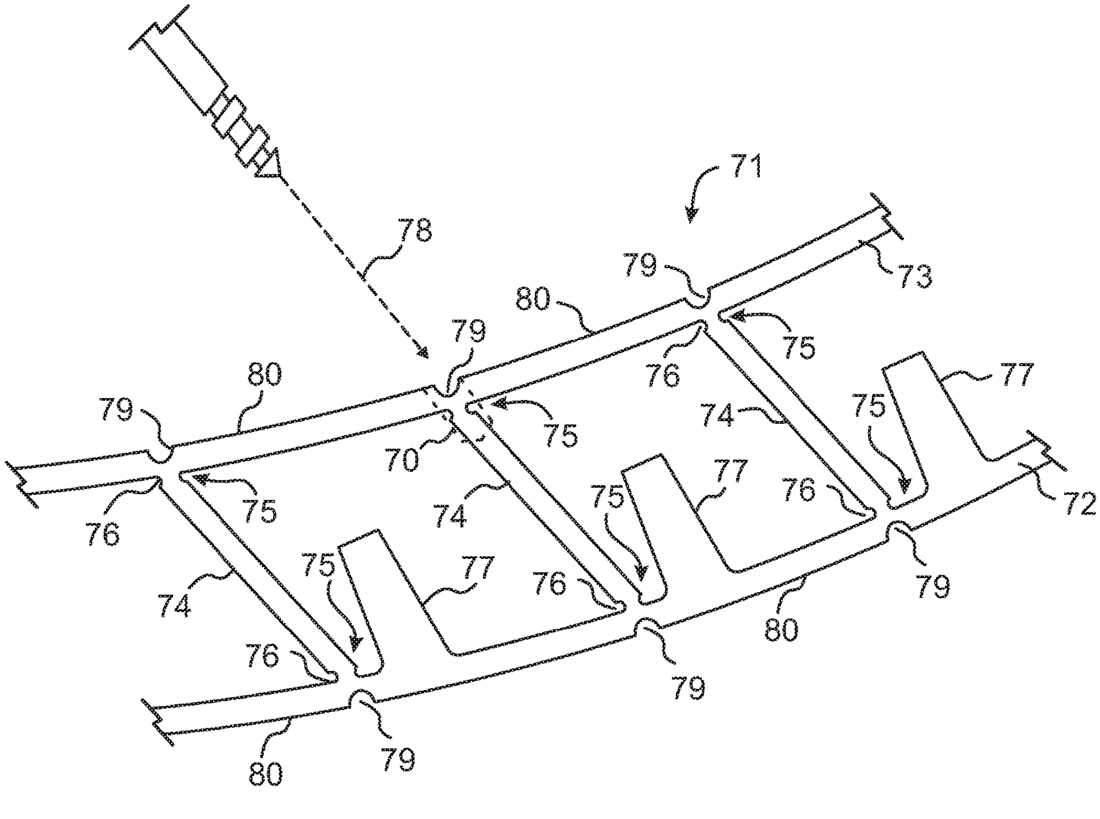
FIG. 10 is a diagrammatical partial cross-sectional side view of another alternate embodiment of the grasping member.

A section of another version of the curling structure is illustrated on FIG. 10. It shows the entire grasping member made of a single poly plastic extrusion 71 made out of a long molecule plastic such as polypropylene, wherein the two sheets 72, 73 are joined by transversal struts 74 each connected at their upper and lower ends by integral hinges 75 formed by creases 76 the whole length of their connections with the sheets. Barriers 77 of tapering heights are interposed between the struts in order to define the maximum extension of the member and the narrowing of its thickness, and strengthen its rigidity. A channel for a tensioning cable may be created by drilling short bores in the direction indicated by the broken arrow 78 through the second sheet 73 into a small section of the underlying struts with a drill bit gauge sufficient to pierce each strut as shown in dotted lines 70 on the drawing. Crease lines 79 may be cut into the two flexible sheets to define a continuum of transversal cantles 80 corresponding to the slats 20 of the first disclosed embodiment while the struts 74 assume the role of its segments 23.

In each of the three above-disclosed embodiments of the grasping members 15, 16, 61 and 71, the length is approximately 12 inches (30 cm) and the width approximately 10 inches (25 cm). The overall thickness at the root is approximately 1.5 inches (4 cm). All suggested dimensions are intended to accommodate patients weighing up to about 500 pounds (225 kgs). It should be understood that these parameters can be adjusted to support heavier and more bulky individuals or other loads.

Figure 11:
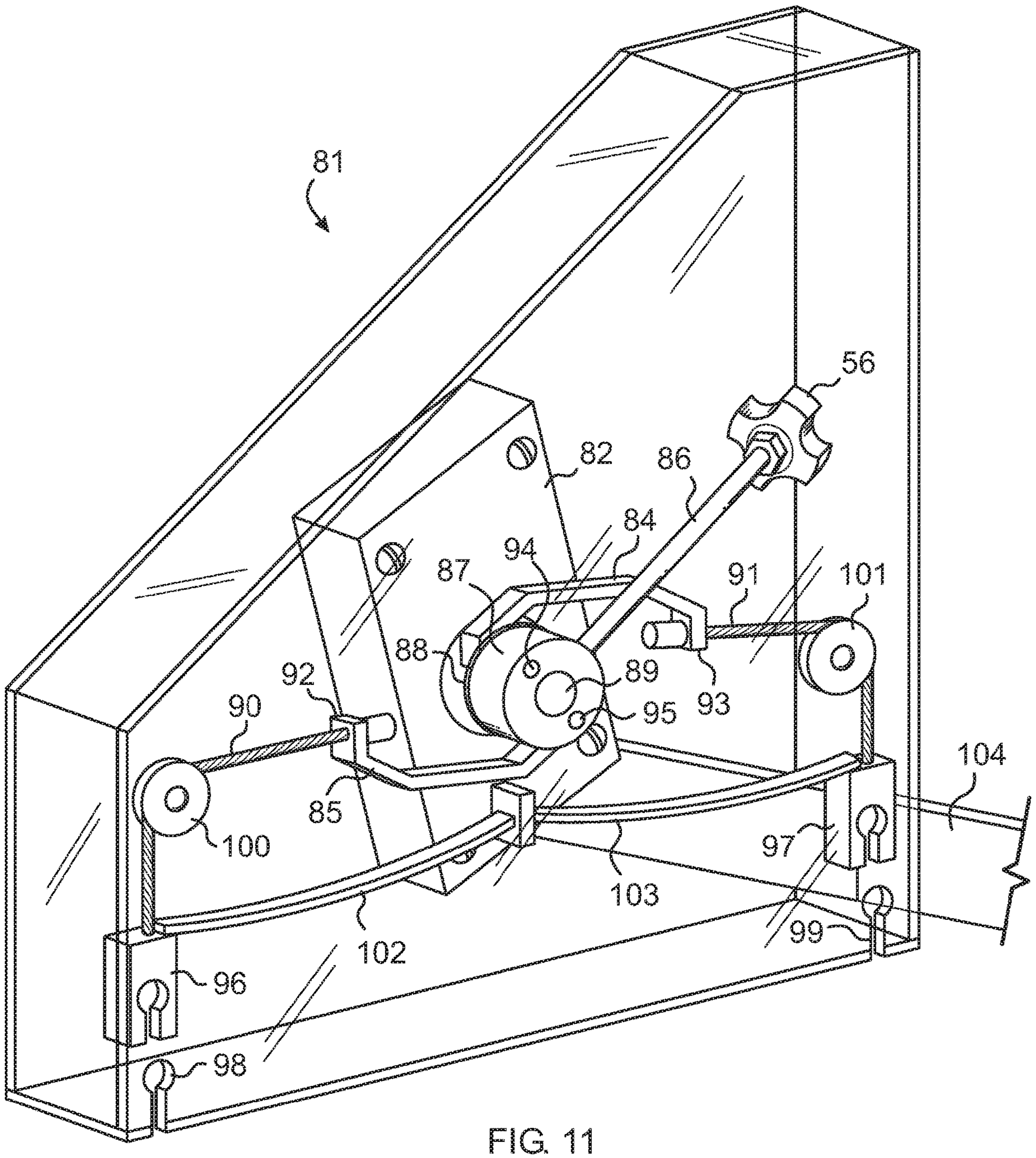
FIG. 11 is a diagrammatical perspective view of a modular driving mechanism unit.

As illustrated in FIG. 11, most of the components of the grasping mechanism may be conveniently packaged in a modular housing 81 having a plurality of enclosing walls and holding an electrical motor 82 part of a cam 83 its associated rockers 84 and 85 and some linking parts. The walls of the housing are shown transparent for clarity.

One of such housing operates each grasping member. The manual operating lever 86 outside the housing is radially connected to a distal portion 87 of the cam protruding through a circular window 88 in the front wall of the housing. The cam is preferably circular rather than oblong as in FIG. 5. The lever and cam act as a clutching mechanism between the shaft and the cam. When the lever is screwed down into the cam by turning the end knob 56 its tip locks the cam to the shaft 89 of the motor. Two lengths of cable 90 and 91 act as linking elements between the distal ends 92 and 93 of the rockers, whose proximal ends are rotatively connected by pins 94 and 95 to peripheral areas of the cam astride the shaft, and releasable connectors 96 and 97 accessible through openings 98 and 99 in the front wall of the housing. The lengths of cable are guided by a pair of pulleys 100 and 101 and kept taut by two leaf springs 102 and 103 acting upon the backs of the releasable connectors. Each housing also mounts one of the arms 104 of the hinges linking the pelvic and torso structures. The releasable connectors are typically attached to the tensioning cable running in opposite sides of the grasping members.

Figure 12:
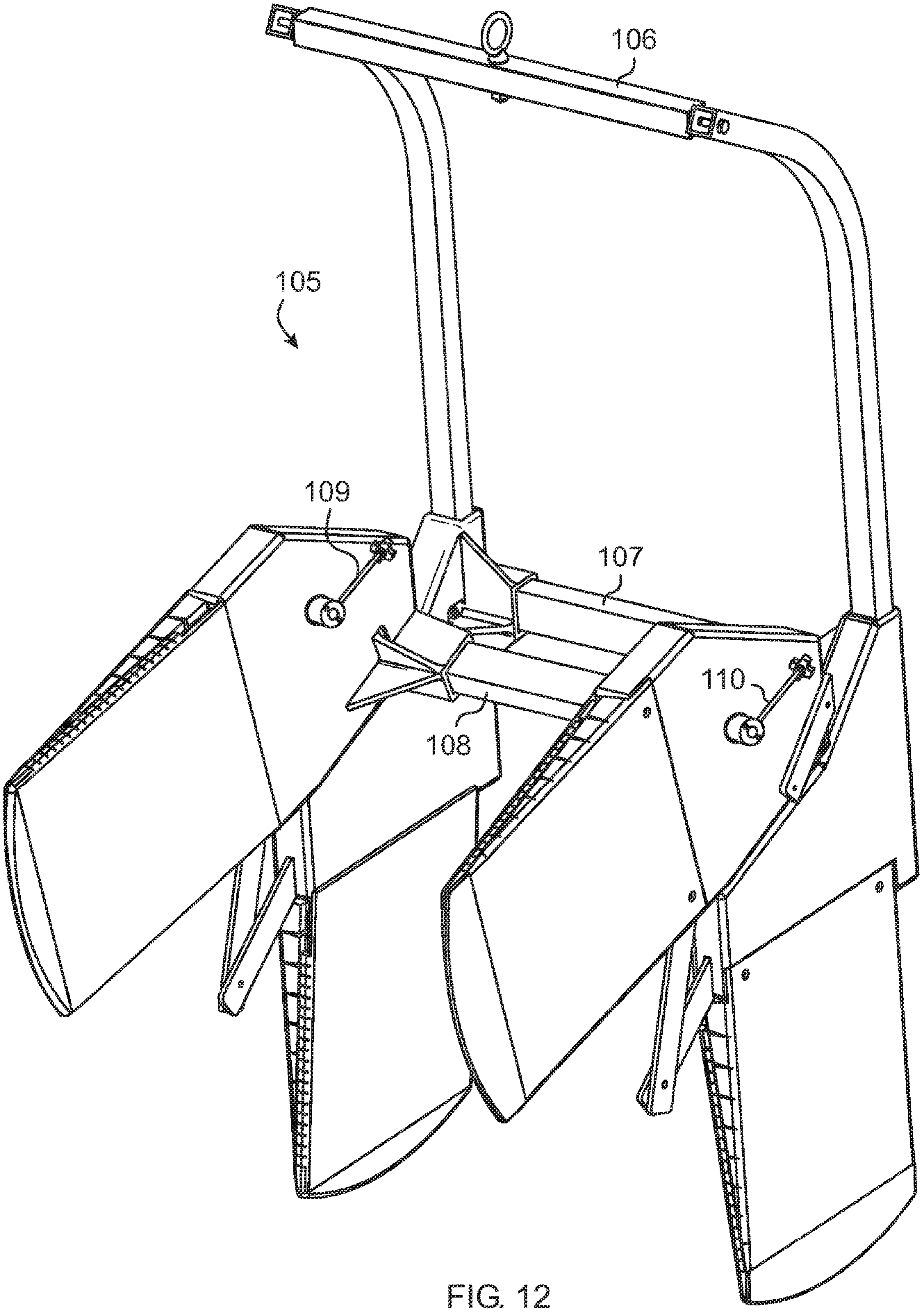
FIG. 12 is a perspective view of a second exemplary of the patient lift in the open position.
Figure 13:
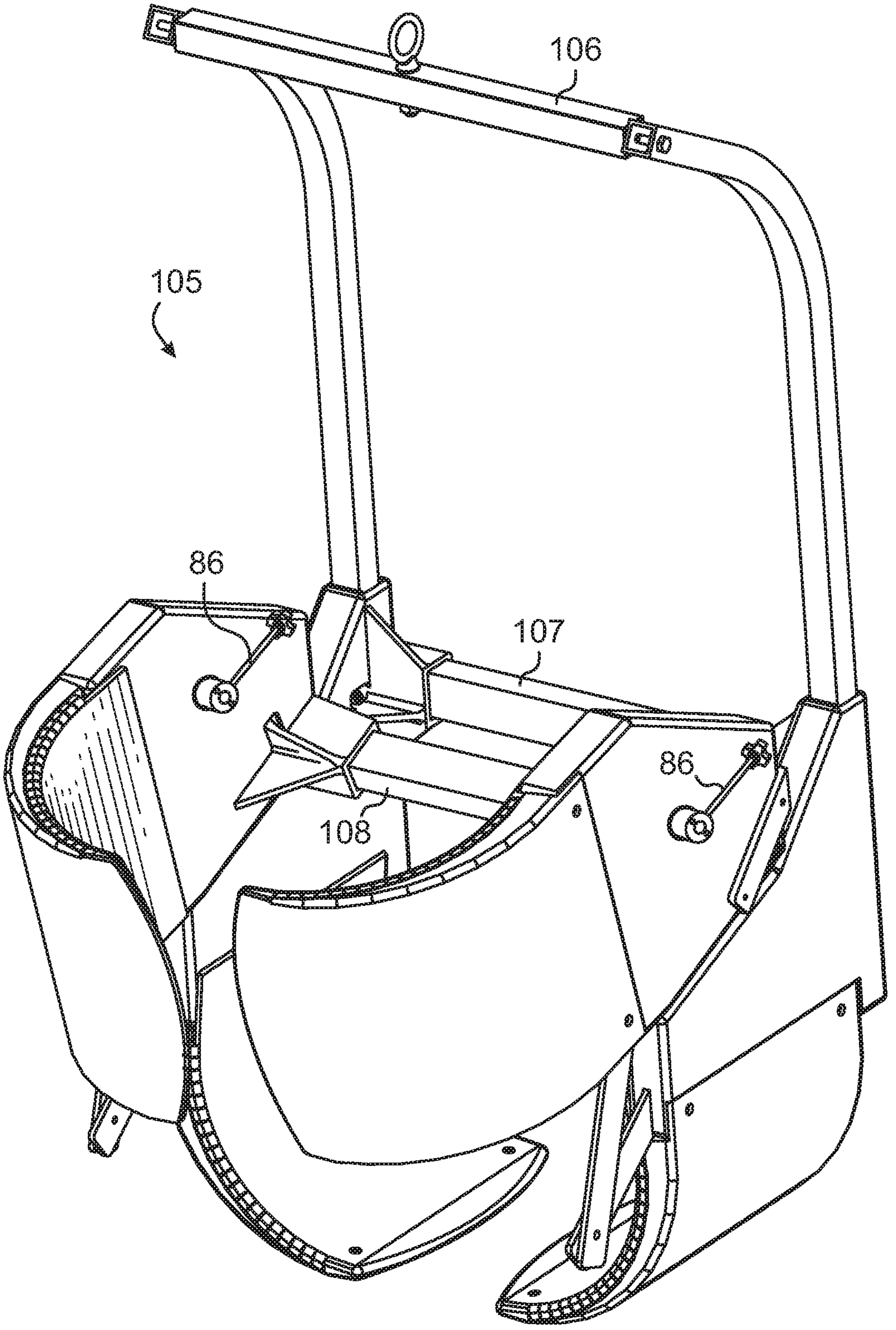
FIG. 13 is a perspective view thereof in the closed position.

FIGS. 12 and 13 illustrate a lift apparatus 105 featuring the grasping members of FIG. 10, and the driving mechanism housing if FIG. 11. It should be noted that the transversal beams 106, 107 and 108 between the right and left frames are preferably telescopically extendable in order to accommodate patients of widely different girths. Alternately, transversal beams of differing lengths can be swapped into place to adjust the width of the frame. It shall be noted that manual operating levers 86 can be provided on either the inside facing side of the modular grasping mechanism housing as shown at 109 or the outside facing side as shown at 110

While the exemplary embodiments of the invention have been described, modifications can be made and other embodiments may be devised without departing from the spirit of the invention and the scope of the appended claims.

The invention claimed is:

1. A system for repositioning a human body, comprising:

at least one grasping member configured to be adjusted between a substantially flat arrangement and an arcuate arrangement;

a console that controls the at least one grasping member to move between the substantially flat arrangement and the arcuate arrangement; and, wherein the console automatically controls the at least one grasping member to move from the substantially flat arrangement to the arcuate arrangement in response to the at least one grasping member coming into contact with a surface on which the human body rests.

2. The system of claim 1, wherein the at least one grasping member comprises a pair of grasping members configured to respectively curl in opposite directions toward each other.

3. The system of claim 2, wherein the at least one grasping member comprises two of the pair of grasping members, wherein a first pair of the two pairs is configured to grasp an upper portion of the human body, and a second pair of the two pairs is configured to grasp a lower portion of the human body.

4. The system of claim 1, wherein the at least one grasping member is configured to reposition the human body from a first position to a second position.

5. The system of claim 4, wherein the first position is a supine position and the second position is a seating position.

6. The system of claim 4, wherein the first position is a seating position and the second position is a supine position.

7. The system of claim 4, wherein the first position is a first supine position and the second position is a second supine position different from the first supine position.

8. The system of claim 1, wherein the console wirelessly controls the at least one grasping member.

9. The system of claim 1, wherein the console controls respective motors of the at least one grasping member to move the at least one grasping member between the substantially flat arrangement and the arcuate arrangement.

10. The system of claim 1, wherein the console further controls respective motors of the at least one grasping member to produce vibrations to facilitate insertion of the at least one grasping member between the human body and a surface on which the human body rests.

11. The system of claim 1, wherein a grasping member of the at least one grasping member comprises a plurality of slats that are substantially parallel to each other.

12. The system of claim 11, wherein each slat of the plurality of slats is attached, via a hinge mechanism, to an adjacent slat of the plurality of slats.

13. The system of claim 1, wherein the at least one grasping member is attached to a frame.

14. The system of claim 1, wherein a grasping member of the at least one grasping member comprises:

a plurality of segments sequentially linked to one another;

wherein each of the segments can rotate with respect to a neighboring one of the segments to form into the arcuate arrangement of the member; and a curling mechanism for concurrently rotating the segments.

* * * * *